United States Patent

Yoshii

[11] Patent Number: 5,681,076
[45] Date of Patent: Oct. 28, 1997

[54] UPPER BODY STRUCTURE FOR VEHICLE BODIES

[75] Inventor: Noboru Yoshii, Hiroshima, Japan

[73] Assignee: Mazda Motor Corporation, Hiroshima, Japan

[21] Appl. No.: 543,204

[22] Filed: Oct. 13, 1995

[30] Foreign Application Priority Data

Oct. 15, 1994 [JP] Japan .................. 6-275702

[51] Int. Cl.⁶ .................................................. B60J 7/16
[52] U.S. Cl. ...................... 296/210; 296/104; 296/218
[58] Field of Search .................................. 296/210, 104, 296/218, 216

[56] References Cited

U.S. PATENT DOCUMENTS 1,696,937  1/1929  Breneman .................. 296/210
4,355,845  10/1982 Ziegler et al. .................. 296/210
4,601,511  7/1986  Nakamura et al. .................. 296/216 X

FOREIGN PATENT DOCUMENTS 20260  2/1956  Germany .................. 296/216

Primary Examiner—David M. Mitchell
Assistant Examiner—Kia M. Robinson
Attorney, Agent, or Firm—Sixbey, Friedman, Leedom & Ferguson, P.C.; Gerald J. Ferguson, Jr.; Donald R. Studebaker

[57] ABSTRACT

An upper vehicle body structure having structural rigidity sufficient to prevent a sunroof unit from sinking has left and right roof side rails, each being formed into a closed cross-section by inner and outer rail panels, each of which has at least a vertical rail section and a horizontal rail section to which an inclining section and horizontal section of a bottom section of an attachment bracket. Roof reinforcements are secured at their bottom sections to the horizontal sections of the attachment brackets.

9 Claims, 4 Drawing Sheets

UPPER BODY STRUCTURE FOR VEHICLE BODIES

BACKGROUND OF THE INVENTION

1. Field of the Invention

The present invention relates to an upper body of an automotive vehicle, and, more particularly, to a vehicle upper body which is reinforced in structural rigidity and prevented from sinking down.

2. Description of Related Art

Typically, a roof structure of a vehicle includes roof side rails provided at each side of the vehicle roof, each of which is formed by inner and outer roof side panels secured to each other so as to form a closed cross-section therein, roof reinforcements extending transversely across the vehicle roof and connecting at both ends with ends of the roof side rails, and a roof panel secured to the roof reinforcements so as to cover the roof side rails and the roof reinforcements. The inner and outer roof side rail panels are welded, or otherwise secured, to each other so as to form a flange protruding upwardly to which one end of the roof reinforcement is secured. Such a roof structure is known from, for instance, Japanese Unexamined Patent Publication No. 2-147379.

A problem associated with a conventional upper vehicle body structure is that, since the ends of the roof reinforcements are secured at both ends to the upwardly protruding flanges provided by the secured inner and outer roof side rail panels, lateral horizontal movement of the roof side rails caused due to vibrations in the roof side rails during driving causes a horizontal force to occur at joints of the roof reinforcements and the roof side rails and acts as a twisting force on them, resulting in insufficient structural rigidity at the joints.

Moreover, if a sunroof unit is installed in a roof panel, the weight of the sunroof unit exerts a downward force on the roof reinforcements, which is manifest as a twisting force at the junctures between the roof reinforcements and roof side rails and forces the roof side rails to bend toward the inside of the vehicle body, i.e. the passenger compartment, making the structural rigidity of the joints all the more inadequate and consequently raising concern that the sunroof unit might sink.

SUMMARY OF THE INVENTION

It is an object of the present invention to provide an upper vehicle body structure which prevents a sunroof unit installed in the roof of the vehicle upper body by providing an increased structural rigidity of the upper body structure, particularly that of the vehicle roof structure.

The object of the present invention is achieved by providing an upper body structure of a vehicle which includes a pair of roof side rails provided at left and right sides of a roof structure, each of which has a closed cross-section defined by at least a vertical wall section and a horizontal wall section, and a plurality of generally U-shaped attachment brackets, each of which is formed at one end with a U-shaped bottom wall section to which both vertical and horizontal wall sections of the roof side rail are secured and at an another end with a joint horizontally extending. A sunroof unit, or alternatively a plurality of reinforcement members, are attached to the roof side rail by means of the attachment brackets. The upper body structure thus provided allows the attachment brackets to follow lateral horizontal movement of the roof side rails caused by vibrations of the vehicle body during running, eliminating a horizontal force to occur in the joints between the attachment brackets and the roof side rails and act as a shearing force on the horizontal joints. By means of which the roof side rails are prevented from being twisted and consequently increases the structural rigidity of the upper vehicle body including the roof structure.

By connecting ends of roof reinforcement members to the horizontal joints of the attachment brackets, a horizontal force produced through lateral horizontal movement of the roof side rails acts as a shearing force on the horizontal joints, maintaining sufficient strength of the roof structure and consequently increasing the structural rigidity of the upper vehicle body.

Alternatively, the sunroof unit is installed in the roof structure of the upper vehicle body, sunroof holding brackets for holding the sunroof unit are arranged along each roof side rail and supported by the attachment brackets. These sunroof holding brackets are firmly support by the attachment bracket, sinking of the sunroof unit is prevented.

With the upper body structure applied to a vehicle in which a sunroof is detachably installed, there are provided a plurality of sunroof holding brackets for supporting the sunroof unit, each of which is supported by the attachment bracket when the sunroof unit is installed. When the sunroof unit is detached, the sunroof holding brackets are replaced with a plurality of the roof reinforcement members and secured to the attachment brackets for reinforcing the roof structure.

The roof side rail comprises an inner panel having an upper connecting flange and an outer panel having an upper connecting flange and a horizontal panel section, the inner and outer panels being coupled to each other by securing the upper connecting flanges to each other so as to form a closed cross-section therein; the horizontal panel section of the outer panel forming the horizontal wall section of the roof side rail; and the upper connecting flanges secured to each other forming the vertical wall section of the roof side rail. The attachment bracket is formed to have a generally U-shaped bottom wall section to which the vertical and horizontal wall sections of the roof side rail are secured.

With the upper vehicle body, the sunroof holding brackets are firmly supported, preventing sinking of the sunroof unit. When there is no sunroof installed, a horizontal force produced through horizontally lateral movement of the roof side rails acts as a shearing force on the horizontal joints, maintaining adequate strength and improving the structural rigidity of the upper vehicle body.

BRIEF DESCRIPTION OF THE DRAWINGS

The above and other objects and features of the present invention will be clearly understood from the following description with respect to a preferred embodiment thereof when considered in conjunction with the accompanying drawings, wherein the same reference numerals having been used throughout the drawings denote same or similar parts or elements, and in which.

DETAILED DESCRIPTION OF THE PREFERRED EMBODIMENTS

Figure 1:
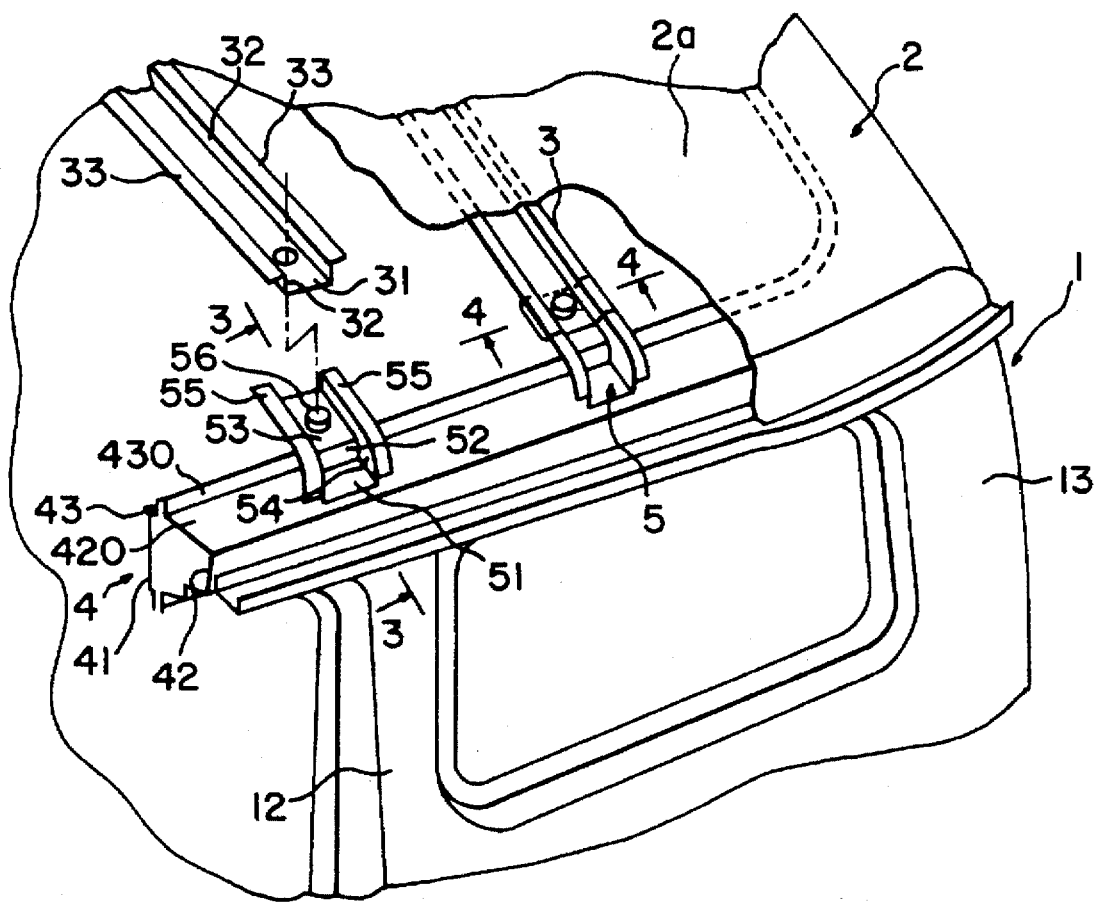
FIG. 1 is an enlarged perspective view of a part of an upper vehicle body according to an embodiment of the present invention encircled and indicated by a reference symbol I in FIG. 2.
Figure 2:
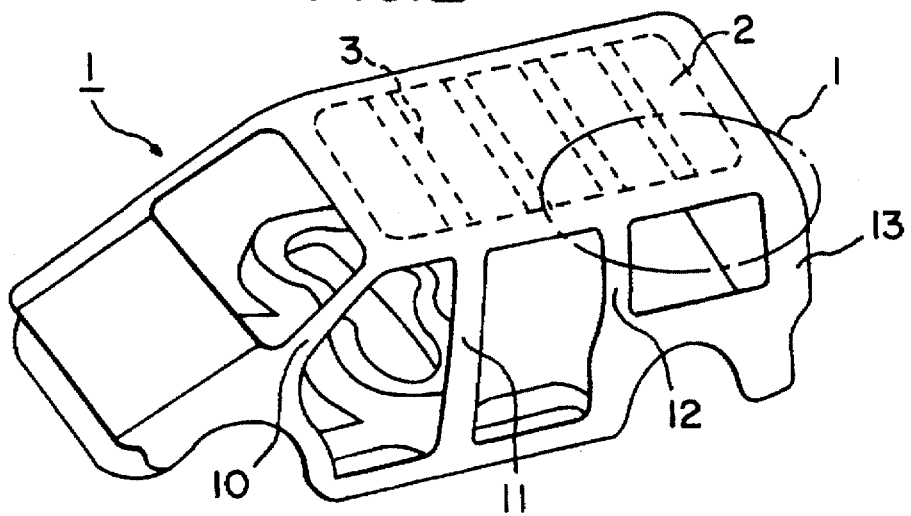
FIG. 2 is a perspective view of a vehicle body in which an upper vehicle body of the present invention is incorporated.
Figure 3:
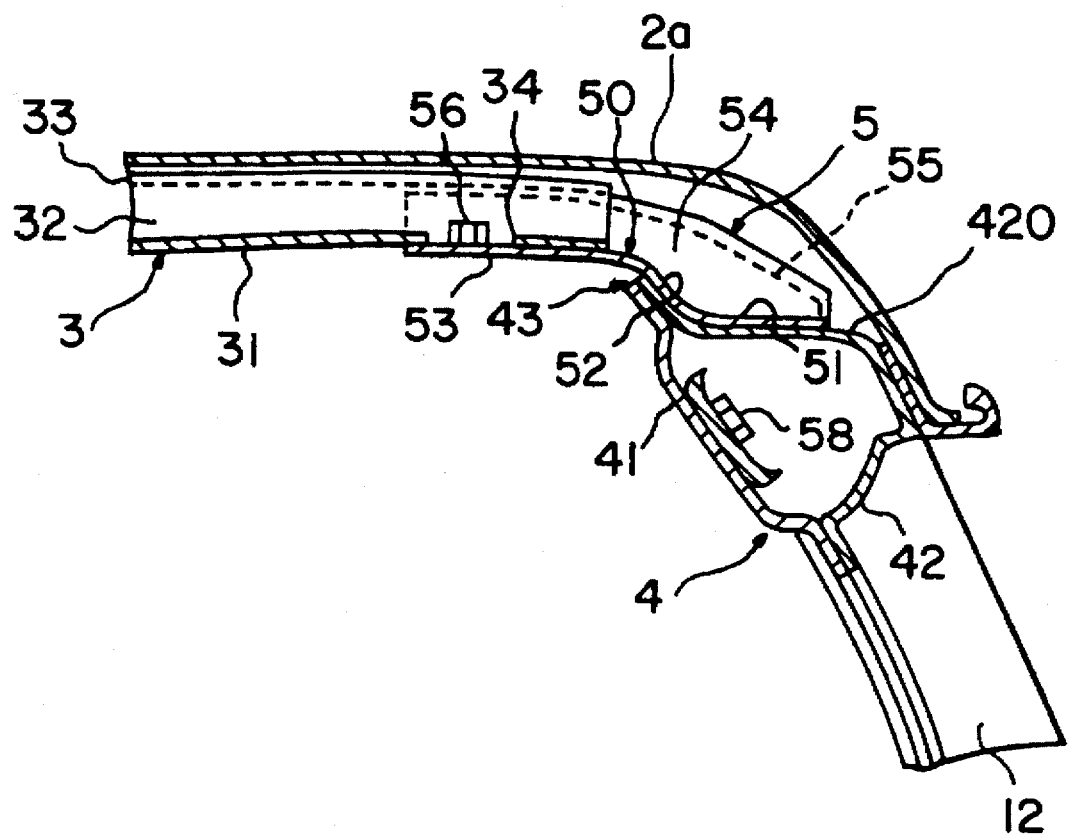
FIG. 3 is a cross-sectional view taken along a line III—III of FIG. 1.
Figure 4:
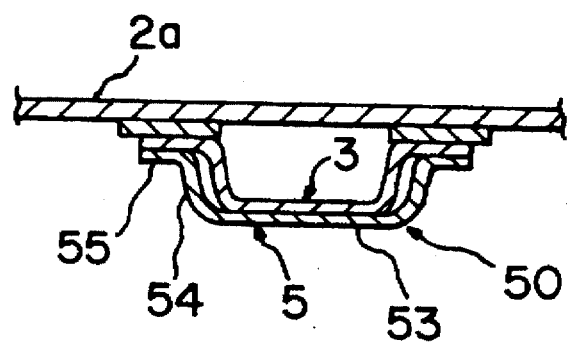
FIG. 4 is a cross-sectional view taken along a line IV—IV of FIG. 1.

Referring to the drawings in detail, and in particular, to FIGS. 1–4, a sunroof 2 of a vehicle body 1 includes a roof panel 2A, roof reinforcement members 3 extending transversely across in the direction of vehicle width on the underside of the roof panel 2A, and roof side rails 4 each of which extends in the lengthwise direction from the front to the back of the vehicle body along each side of the roof 2, and is connected to the tops of pillars 10, 11, 12 and 13. The roof side rail 4 is formed into a closed cross-section by connecting a generally U-shaped roof side rail inner panel 41 and a roof side rail outer panel 42 to each other. The roof side rail outer panel 42 is endowed with a horizontal surface 420 which is formed as a top surface extending horizontally along the top of the roof side rail outer panel 42, and a vertical surface 430 which is formed as an outer side surface of a joint flange 43 to which the roof side rail inner panel 41 is secured.

A generally U-shaped attachment bracket 5 is formed by a bottom wall section 50, a pair of side wall sections 54 extending upwardly from both sides of the bottom wall section 50, and a flange 55 extending laterally outside along the top edge of each of the side wall sections 54. The bottom wall section 50 is endowed with a first horizontal wall section 51 on one side thereof (on the outside of the vehicle body in this embodiment) an inclining wall section 52 extending upwardly from the first horizontal wall section 51, and a second horizontal wall section (joint wall section) 53 extending approximately horizontally from the inclining wall section 52 on another side of the bottom wall section 50 (on the inside of the vehicle body in this embodiment) opposite to the side where the first horizontal wall section 51 is provided. The bottom wall section 50 is provided with a positioning nut 56 securely attached to the second horizontal wall section 53. The bottom surface of the first horizontal surface wall section 51 of the bottom wall section 50 is welded, or otherwise secured, to the horizontal surface 420 of the roof side rail 4, and the bottom surface of the inclining wall section 52 is welded, or otherwise secured, to the vertical surface 430 of the roof side rail 4.

Each roof reinforcement member 3, which has a closed cross-section, is formed by a bottom wall section 31, a pair of side wall sections 32.extending upwardly from sides of the bottom wall section 31, respectively, and support flanges 33 extending outwardly from sides of the side wall sections 32, respectively. The roof reinforcement member 3 is provided with a positioning hole 34 formed in the bottom wall section 31 in the vicinity of the outer end of the vehicle and having an inner diameter larger than the positioning nut 56 attached to the attachment bracket 5.

At each end, the roof reinforcement member 3 is placed on and secured to one end, i.e. the second horizontal wall section 53, of the attachment bracket 5 which in turn is secured to the roof side rail 4 at another end through the first horizontal wall section 51 and the inclining wall section 52. That is, the roof reinforcement member 3 is secured to the attachment bracket 5 with the outer end of its bottom wall section 31 positioned in conformity with the second horizontal wall section 53 of the attachment bracket 5. The roof side rail 4 is provided with nuts 58 securely attached to the inner surface of the roof side rail inner panel 41. These nuts 58 are used when a sunroof unit is installed in the roof structure as will be described in detail later. In this instance, the positioning nut 56 of the second horizontal wall section 53 fits into the positioning hole 34 of the bottom wall section 31 of the roof reinforcement member 3 for easy positioning when performing spot welding or the like.

With the vehicle upper body structure, since the attachment bracket 5 follows lateral horizontal movement of the roof side rails 4 associated with vibrations of the vehicle body during driving, a horizontal force occurs in the second horizontal wall section 53 of the attachment bracket 5 which comprises joints to the roof side rails 4 and serves as a shearing force, eliminating an occurrence of a twisting force against the roof side rail 4 and consequently increasing the structural rigidity of the vehicle roof. Together, since the roof reinforcement members 3 are connected at their ends to the horizontal joints, namely the second horizontal wall sections 53, of the attachment brackets 5, a lateral horizontal force produced by lateral horizontal movement of the roof side rails 4 acts as a shearing force on the horizontal joints, namely the second horizontal wall sections 53, of the attachment brackets 5, easily providing the ensured structural strength of the vehicle body and increasing the structural rigidity of the vehicle body.

Figure 5:
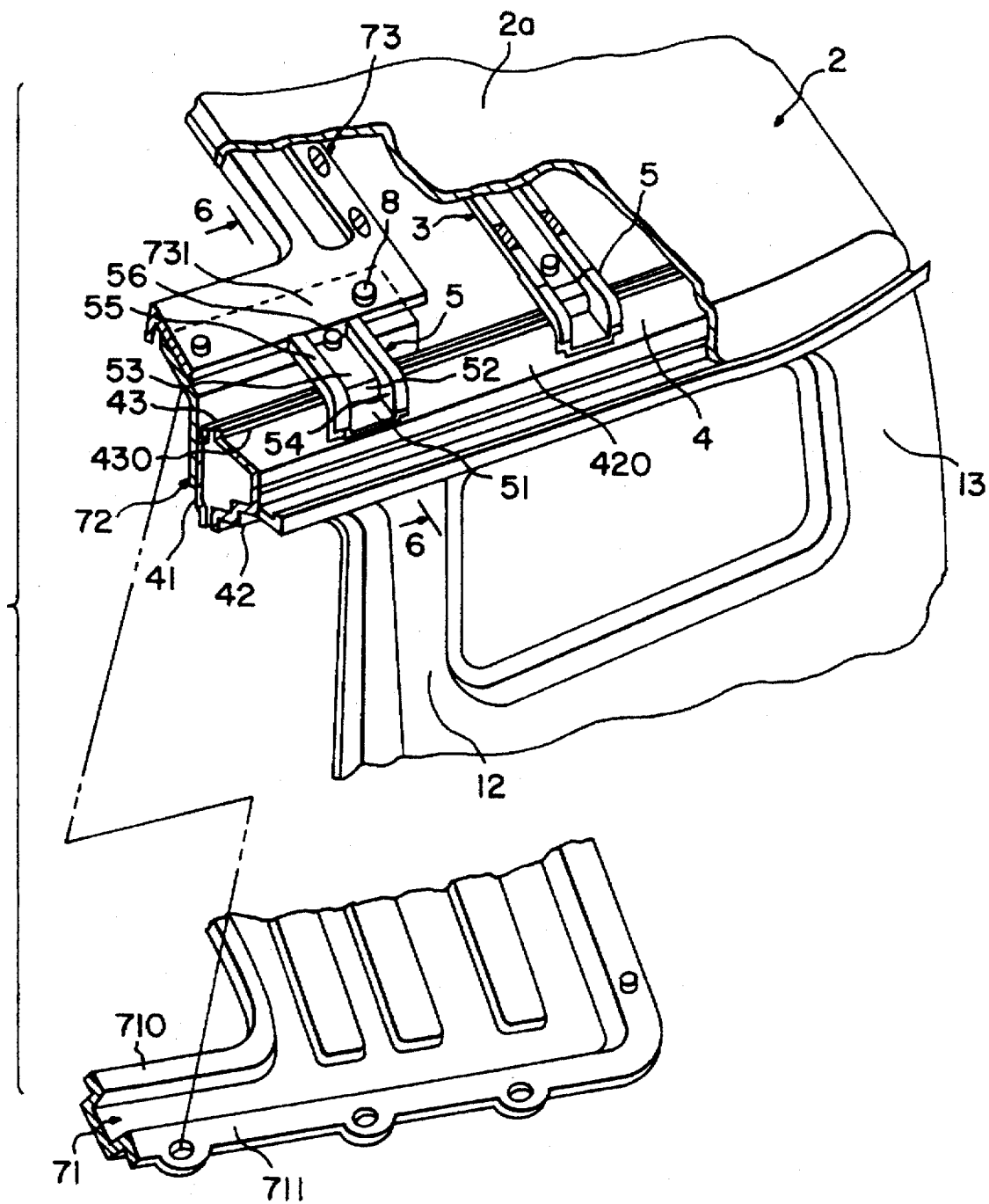
FIG. 5 is an enlarged perspective view of a part of an upper vehicle body according to another embodiment of the present invention.
Figure 6:
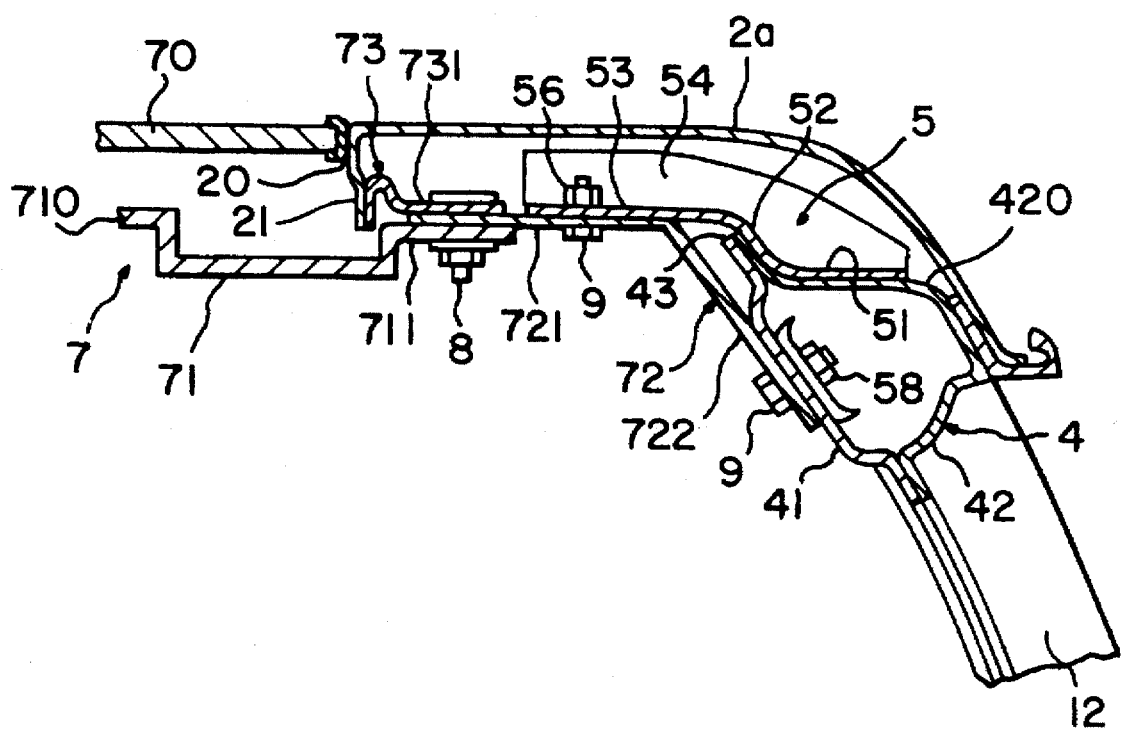
FIG. 6 is a cross-sectional view taken along a line VI—VI of FIG. 5.

Referring to FIGS. 5 and 6 showing another preferred embodiment of the present invention in which a sunroof unit is installed in the upper body of a vehicle, a sunroof unit 7 includes a sunroof 70 for opening and closing a sunroof opening 20 surrounded by a peripheral flange 21 in a roof panel 2A, a sunroof unit base plate 71 having an opening 710 and a peripheral flange 711, a plurality of sunroof attachment brackets 72 which are disposed between the peripheral flange 711 of the sunroof unit base plate 71 and a plurality of attachment brackets 5 disposed along roof side rails 4 so as to couple the sunroof unit base plate 71 to the attachment brackets 5 together, and a fixing frame 73 disposed between the peripheral flange 21 surrounding the sunroof opening 20 and the sunroof attachment brackets 72 so as to couple the sunroof attachment brackets 72 and the sunroof 2 together.

Each attachment bracket 5 is secured to the roof side rail with the first horizontal wall section 51 of the bottom wall section 50 welded, or otherwise secured, to the horizontal surface 420 of the roof side rail 4 and with the inclining wall section 52 welded, or otherwise secured, to the vertical surface 430 of the roof side rail 4. The sunroof holding bracket 72 is connected at its inner end to the attachment bracket 5 with its horizontal wall section 721 secured to the second horizontal wall section (joint) 53 by means of engagement between a bolt 9 and a nut 56 from the underside and at its outer end to the roof side rail 4 with an inclining wall section 722 secured to the roof side rail inner panel 41 of the roof side rail 4 by means of engagement between a bolt 9 and a nut 58 from the inside. A peripheral flange 711 of the sunroof unit base plate 71 lies underneath the horizontal wall section 721 of the sunroof holding bracket 72, on top of which lies a side portion 731 of the fixing frame 73, these three elements being secured all together by the bolt 9.

Since the upper body structure supports the attachment bracket 5 and the sunroof holding brackets 72, both secured firmly to the roof side rails 4, preventing the sunroof unit 7 from sinking and consequently improving the structural rigidity of the vehicle body.

With the upper vehicle body structure of the present invention thus structured, various effects are demonstrated.

By providing the roof side rail at each side of the roof structure of the upper vehicle body, each being formed with a closed cross-section therein and having horizontal and vertical wall sections, and a plurality of the attachment brackets arranged along the roof side rail, each being formed in a U-shaped cross section and having a U-shaped bottom wall section at one end connecting with the horizontal and vertical wall sections of the roof side rails and a horizontal joint wall section at another end, the attachment brackets follow lateral horizontal movement of the roof side rails caused by vibrations of the vehicle during running, horizontal forces produced at the joint wall sections act as shearing forces on the horizontal joint wall sections, so that there is not caused any twisting force against the roof side rails, and the structural rigidity of the upper vehicle body is increased.

In addition, by connecting the end of the roof reinforcement members with the horizontal joint wall sections of the attachment brackets, a horizontal force produced by lateral horizontal movement of the roof side rails acts as a shearing force on the joint wall sections, assuring adequate strength of the upper vehicle body and increasing the structural rigidity of the upper vehicle body.

Furthermore, with the upper vehicle body structured as above in which a sunroof unit is installed therein, by supporting the sunroof holding brackets for supporting the sunroof unit with the attachment brackets, the sunroof brackets are firmly supported, preventing sinking of the sunroof unit.

For the upper body structure with a sunroof unit detachably installed therein, by providing the roof side rail at each side of the roof structure of the upper vehicle body, each being formed with a closed cross-section therein and having horizontal and vertical wall sections, and a plurality of the attachment brackets arranged along the roof side rail, each being formed in a U-shaped cross section and having a U-shaped bottom wall section at one end connecting with the horizontal and vertical wall sections of the roof side rails and a horizontal joint wall section at another end, and supporting the sunroof unit, when installed, by the sunroof holding brackets which are supported by the attachment bracket, and supporting, when the sunroof is detached, the roof reinforcement members, in place of the sunroof holding brackets, by the attachment bracket, the attachment brackets firmly support the sunroof holding brackets when the sunroof unit is installed, preventing sinking of the sunroof unit. On the other hand, when the sunroof unit is detached, a horizontal force produced through horizontal movement of the roof side rails acts as a shearing force against the horizontal joints of the attached brackets, providing sufficient strength to the upper vehicle body and improving the structural rigidity of the upper vehicle body.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An upper body structure for a vehicle, comprising:
a pair of roof side rails disposed at opposite sides of and secured to a top of a roof structure of the vehicle, each said roof side rail being formed into a closed cross-section therein and extending in a lengthwise direction from the front to the back of the top of the vehicle and having at least a vertical rail section and an approximately horizontal rail section;

a plurality of attachment brackets arranged along each said roof side rail, each said attachment bracket comprising one transverse end to which said vertical section and said approximately horizontal section of said roof side rail are secured and another transverse end remote from said roof side rail which has a horizontal bracket section extending inwardly, each said roof side rail comprising an inner panel having an upper connecting flange and an outer panel having an upper connecting flange and a horizontal panel section, said inner and outer panels being coupled to each other by securing said upper connecting flanges to each other so as to form a closed cross-section therein, said horizontal panel section of said outer panel forming said horizontal section of said roof side rail and said upper connecting flanges secured to each other forming said vertical section of said roof side rail; and a plurality of roof reinforcement members by which a roof panel is supported and said roof structure is reinforced, each said roof reinforcement member extending transversely between a pair of said attachment brackets at both sides of the roof structure and secured at both ends thereof to said horizontal bracket sections of said pair of said attachment brackets.

2. An upper body structure as defined in claim 1, wherein each said attachment bracket is formed to have a generally U-shaped bottom section to which said vertical and horizontal sections of each said roof side rail are secured.

3. An upper body structure as defined in claim 1, and further comprising positioning means disposed between each said attachment bracket and each said roof reinforcement member for positioning said roof reinforcement member relative to said attachment bracket.

4. An upper body structure for a vehicle, comprising:
a pair of roof side rails disposed at opposite sides of and secured to a top of a roof structure of the vehicle, each said roof side rail being formed into a closed cross-section therein and extending in a lengthwise direction from the front to the back of the top of the vehicle and having at least a vertical rail section and an approximately horizontal rail section;

a plurality of attachment brackets arranged along each said roof side rail, each said attachment bracket comprising one transverse end to which said vertical section and said approximately horizontal section of said roof side rail are secured and another transverse end remote from said roof side rail which has a horizontal bracket section extending inwardly, each said roof side rail comprising an inner panel having an upper connecting flange and an outer panel having an upper connecting flange and a horizontal panel section, said inner and outer panels being coupled to each other by securing said upper connecting flanges to each other so as to form a closed cross-section therein, said horizontal panel section of said outer panel forming said horizontal section of said roof side rail and said upper connecting flanges secured to each other forming said vertical section of said roof side rail; and a sunroof unit for opening and closing an opening formed in said roof panel, a plurality of sunroof holding brackets by means of which said sunroof unit is supported, and coupling means for connecting each said sunroof holding bracket to said attachment bracket.

5. An upper body structure as defined in claim 4, wherein each said attachment bracket is formed to have a generally U-shaped bottom section to which said vertical and horizontal section of each said roof side rail are connected.

6. An upper body structure for a vehicle which includes a detachable sunroof unit for opening and closing an opening in a roof structure, said upper body structure comprising:

a pair of roof side rails disposed at opposite sides of and secured to a top of said roof structure of the vehicle, each said roof side rail being formed into a closed cross-section therein and extending in a lengthwise direction from the front to the back of the top of the vehicle and having at least a vertical rail section and an approximately horizontal rail section;

a plurality of attachment brackets arranged along each said roof side rail, each said attachment bracket comprising one transverse end to which said vertical section and said approximately horizontal section of said roof side rail are secured and another transverse end remote from said roof side rail which has a horizontal bracket section extending horizontally inwardly;

a plurality of sunroof holding brackets for supporting said sunroof unit, each said sunroof holding bracket being supported by said attachment bracket when said sunroof unit is installed; and a plurality of roof reinforcement members, replaceable with said sunroof holding brackets, for reinforcing said roof structure, each said roof reinforcement member extending transversely between a pair of said attachment brackets at both sides of the upper body structure and secured at both ends thereof to said horizontal bracket sections of said pair of said attachment brackets when said sunroof unit is detached.

7. An upper body structure as defined in claim 6, wherein each said roof side rail comprises an inner panel having an upper connecting flange and an outer panel having an upper connecting flange and a horizontal panel section, said inner and outer panels being coupled to each other by securing said upper connecting flanges to each other so as to form a closed cross-section therein, said horizontal panel section of said outer panel forming said horizontal section of said roof side rail and said upper connecting flanges secured to each other forming said vertical section of said roof side rail.

8. An upper body structure as defined in claim 6, wherein each said attachment bracket is formed to have a generally U-shaped bottom section to which said vertical and horizontal sections of each said roof side rail are secured.

9. An upper body structure as defined in claim 6, and further comprising a nut secured to said horizontal bracket section of each said attachment bracket, said nut being engaged by a bolt therein so as to secure said sunroof holding bracket to said attachment bracket when said sunroof unit is installed and being fitted in an positioning hole formed in one end of said reinforcement member so as to position said reinforcement member relative to said attachment bracket when said sunroof unit is replaced with said reinforcement members.

* * * * *